US008744909B2

(12) United States Patent
Baiz Matuk

(10) Patent No.: US 8,744,909 B2
(45) Date of Patent: Jun. 3, 2014

(54) SYSTEM AND METHOD OF GUARANTEED COGNITIVE AWARENESS

(75) Inventor: Enrique A. Baiz Matuk, Sunny Isles Beach, FL (US)

(73) Assignee: Papatel, Inc., Sunny Isles Beach, FL (US)

( * ) Notice: Subject to any disclaimer, the term of this patent is extended or adjusted under 35 U.S.C. 154(b) by 0 days.

(21) Appl. No.: 13/393,906

(22) PCT Filed: Sep. 2, 2010

(86) PCT No.: PCT/US2010/047663
§ 371 (c)(1),
(2), (4) Date: May 14, 2012

(87) PCT Pub. No.: WO2011/028893
PCT Pub. Date: Mar. 10, 2011

(65) Prior Publication Data
US 2012/0232986 A1    Sep. 13, 2012

Related U.S. Application Data

(60) Provisional application No. 61/239,570, filed on Sep. 3, 2009.

(51) Int. Cl.
G06Q 30/00    (2012.01)
G06Q 30/02    (2012.01)

(52) U.S. Cl.
CPC ........ *G06Q 30/0245* (2013.01); *G06Q 30/0252* (2013.01); *G06Q 30/0277* (2013.01)
USPC .................... 705/14.44; 705/14.5; 705/14.73

(58) Field of Classification Search
USPC .................................................... 705/14.44
See application file for complete search history.

(56) References Cited

U.S. PATENT DOCUMENTS

| 3,784,721 A | 1/1974 | Kilby |
| 4,130,801 A | 12/1978 | Prygoff |
| 4,321,665 A | 3/1982 | Shen et al. |
| 5,396,542 A | 3/1995 | Alger et al. |
| 5,481,611 A | 1/1996 | Owens et al. |
| 5,845,205 A | 12/1998 | Alanara et al. |
| 5,883,964 A | 3/1999 | Alleman |

(Continued)

OTHER PUBLICATIONS

PCT International Preliminary Report and Written Opinion for PCT/US2010/047663 mailed Oct. 28, 2010; 6 pages.

(Continued)

*Primary Examiner* — John G Weiss
*Assistant Examiner* — Scott C Anderson
(74) *Attorney, Agent, or Firm* — Hunton & Williams LLP

(57) ABSTRACT

Exemplary embodiments of the invention provide systems and methods for verifying a consumer's cognitive awareness of an advertisement. Aspects of the invention provide a method of receiving a request for services from a consumer, presenting at least one advertisement to the consumer, presenting at least one verification question to the consumer, receiving at least one verification response from the consumer, and determining whether the at least one verification response matches at least one correct response. If the at least one verification response matches the correct response, then access to the service is granted. If the at least one verification response does not match the correct response, then access to the service is not granted. In some embodiments of the invention, the consumer is allowed to repeat the verification process if the verification response does not match the correct response.

11 Claims, 4 Drawing Sheets

(56) References Cited

U.S. PATENT DOCUMENTS

| | | |
|---|---|---|
| 6,009,150 A | 12/1999 | Kamel |
| 6,301,342 B1 | 10/2001 | Ander et al. |
| 6,496,857 B1 | 12/2002 | Dustin et al. |
| 6,590,970 B1 | 7/2003 | Cai et al. |
| 6,614,896 B1 | 9/2003 | Rao |
| 6,683,941 B2 | 1/2004 | Brown et al. |
| 6,856,673 B1 | 2/2005 | Banks et al. |
| 6,889,054 B2 | 5/2005 | Himmel et al. |
| 6,947,531 B1 | 9/2005 | Lewis et al. |
| 6,993,497 B2 | 1/2006 | Yeh et al. |
| 7,440,563 B2 | 10/2008 | Baiz Matuk |
| 2001/0012344 A1 | 8/2001 | Kwon |
| 2002/0046087 A1 | 4/2002 | Hey |
| 2002/0046098 A1* | 4/2002 | Maggio ............ 705/14 |
| 2003/0003929 A1 | 1/2003 | Himmel et al. |
| 2003/0050837 A1 | 3/2003 | Kim |
| 2003/0182558 A1 | 9/2003 | Lazzaro et al. |
| 2004/0091093 A1 | 5/2004 | Bookstaff |
| 2005/0086104 A1 | 4/2005 | McFadden |
| 2005/0149385 A1 | 7/2005 | Trively |
| 2006/0067494 A1 | 3/2006 | Slagle et al. |
| 2006/0206381 A1 | 9/2006 | Frayman |
| 2007/0026852 A1 | 2/2007 | Logan et al. |
| 2007/0055565 A1 | 3/2007 | Baur et al. |
| 2007/0061198 A1 | 3/2007 | Ramer et al. |
| 2007/0186252 A1* | 8/2007 | Maggio ............ 725/86 |
| 2007/0226805 A1 | 9/2007 | Jeal et al. |
| 2008/0133329 A1 | 6/2008 | Ullah |
| 2009/0216569 A1 | 8/2009 | Bonev et al. |
| 2009/0265214 A1 | 10/2009 | Jobs et al. |

OTHER PUBLICATIONS

Randall Stross, Apple Wouldn't Risk Its Cool Over a Gimmick, Would It?, *The New York Times*, Digital Domain, http:/www.nytimes.com/2009/11/15/business/15digi.html, Nov. 15, 2009, pp. 1-3.

Chetham, "Endure an Ad, Make a Free Call", wireless Week, vol. 5, No. 46, Nov. 15, 1999, p. 28.

\* cited by examiner

SYSTEM AND METHOD OF GUARANTEED COGNITIVE AWARENESS

RELATED APPLICATIONS

The present application claims priority to U.S. Provisional Patent Application Ser. No. 61/239,570, filed Sep. 3, 2009, the disclosure of which is incorporated by reference in its entirety.

The present application is related to U.S. Pat. No. 7,440,563 entitled "Telecommunication and Advertising Business Model and Method of Utilizing the Same," and filed on Mar. 2, 2007, the disclosure of which is hereby incorporated by reference in its entirety.

FIELD OF THE INVENTION

The invention relates generally to the field of advertising and, in some embodiments, to systems and methods that ensure user cognitive awareness of advertising content.

BACKGROUND OF THE INVENTION

As new media continue to gain ground over print and analog broadcast media, advertisers are evolving their marketing and advertising to keep pace with the rise of new media and new media technologies. Consumers increasingly seek information, services, and entertainment through new media, and advertisers are finding that they have to understand this fact and adapt their advertising and marketing to new media and new media technologies or risk becoming irrelevant.

Many advertisers incorporate advertising techniques for new media in ways that are similar to print and traditional broadcast media, i.e., providing advertising space and time to sponsors in print (e.g., in newspapers) or video formats (e.g., on television shows or in movies). Unlike print and analog broadcast media, however, many new media and new media technologies allow a consumer to interact with sponsors through their advertisements by enabling connectivity between the consumer and the information presented. This creates synergies for sponsors advertising through new media technologies that were impossible with print and analog broadcast media.

One problem that advertisers face, however, is how to ensure consumers are actually cognitively conscious of the sponsor's advertisements when using new media. For example, a consumer watching a television show on new media technology such as hulu.com might mute the sound on the advertisement or perform other tasks instead of paying attention to the advertisement. This creates a problem for advertisers and new media companies alike as the sponsors that pay for the advertising that partly or wholly funds new media companies may suspect that they are getting little in return for their advertising money, thus reducing investment or revenues in new media advertising. This problem is not limited to just new media, as print and traditional broadcast media also face the problem of ensuring cognitive consumer awareness of their advertisements.

Furthermore, this problem is compounded by the recent rise of free services in exchange for sponsor's advertising. Some of these services allow a consumer to connect to the internet at no cost in exchange for listening to a sponsor's advertisements. These free services, however, suffer the same problem as the new media and traditional broadcast media of ensuring a consumer's cognitive awareness during the sponsor's advertisement that provides the free service.

It would therefore be desirable to have a verification process that ensures a consumer is cognitively aware of an advertisement.

SUMMARY OF THE INVENTION

The present invention provides systems and methods for verifying a consumer's cognitive awareness of an advertisement. Aspects of the invention provide a method of receiving a request for services from a consumer, presenting at least one advertisement to the consumer, presenting at least one verification question to the consumer, receiving at least one verification response from the consumer, and determining whether the at least one verification response matches at least one correct response. If the at least one verification response matches the correct response, then access to the service is granted. If the at least one verification response does not match the correct response, then access to the service is not granted. In some embodiments of the invention, the consumer is allowed to repeat the verification process if the verification response does not match the correct response.

Aspects of the invention also include a system for verifying a consumer's cognitive awareness of a video advertisement. Aspects of the invention include receiving at least one video advertisement from a sponsor, storing the at least one video advertisement on a computer system comprising a database, receiving a request for services from the consumer, presenting at least one advertisement to the consumer, presenting at least one verification question to the consumer, receiving at least one verification response from the consumer, and determining whether the at least one verification response matches at least one correct response. If the at least one verification response matches the correct response, then access to the service is granted. If the at least one verification response does not match the correct response, then access to the service is not granted. In some embodiments of the invention, the consumer may be asked to provide authentication information when they request services. In some embodiments of the invention, the consumer may be presented with at least one survey question and the computer system comprising the database may receive the responses to the at least one survey question. In some embodiments of the invention, the consumer is allowed to repeat the verification process if the verification response does not match the correct response.

It is to be understood that both the foregoing general description and the following detailed description are exemplary and explanatory only, and are not restrictive of the invention as claimed. The accompanying drawings constitute a part of the specification, illustrate certain embodiments of the invention and, together with the detailed description, serve to explain the principles of the invention.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE PREFERRED EMBODIMENTS

Certain embodiments of the present invention provide systems and methods for verifying a consumer's cognitive awareness of an advertisement. As used herein, the term "advertisement" means any audio or visual data that communicates a message about products or services to a consumer.

As used herein, the term "interactive media" includes telephones or any other electronic media that allow for the active participation of one or more people. As used herein, the term "broadcast media" includes radio and television broadcasts designed to communicate information or entertainment through audio or visual data. As used herein, the term "new media" means any digital, computerized, or networked information and communication technology designed to communicate information or entertainment through audio and/or visual data. As used herein, the term "new media technologies" means any device capable of transmitting and/or receiving new media. Examples of new media technologies include internet websites, satellite radio and television, video games, electronic book readers, podcasts, PDAs, telephones, cell phones, and other technologies.

Figure 1A:
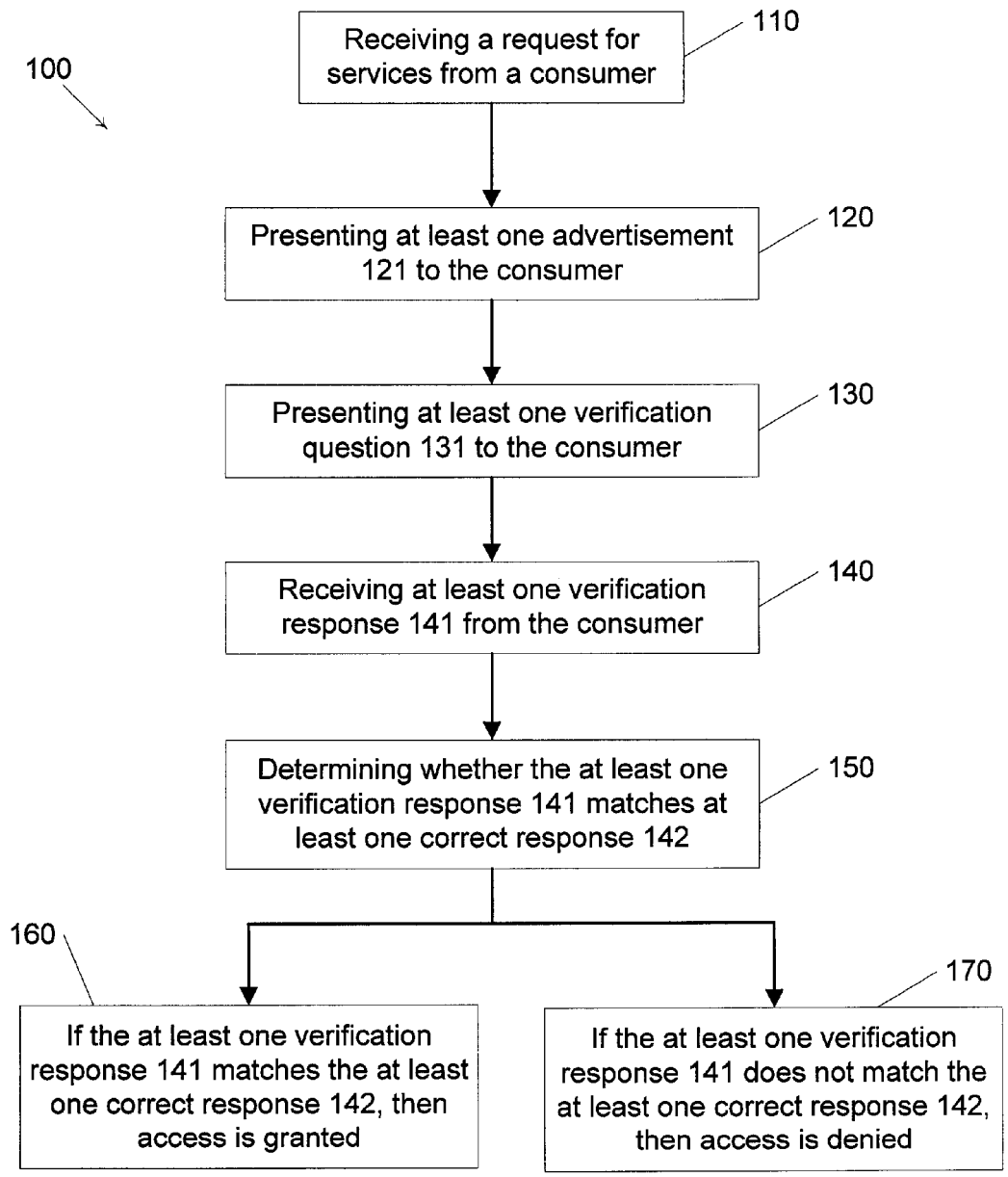
FIG. 1 is a schematic diagram depicting a verification process to ensure a consumer is conscious of an advertisement according to an embodiment of the invention.

FIG. 1A is a schematic diagram depicting a verification process 100 to ensure a consumer is cognitively conscious of an advertisement according to one embodiment of the invention. The verification process 100 is carried out by a computer system 101 comprising a database 102. In step 110, the consumer makes a request for a service. The service requested by the consumer may be, but is not limited to, listening to a radio program, viewing information on a social networking webpage, listening to a podcast, viewing a television show, making a phone call, viewing a news article in an online newspaper or magazine, or any other type of service, interactive media service, broadcast media service, or new media service. The consumer could be one person or a plurality of people who are requesting the service.

Figure 1B:
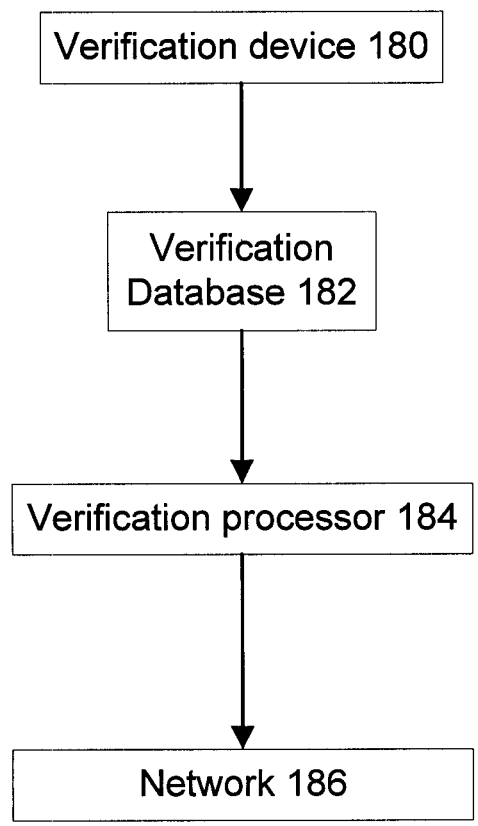

As shown in FIG. 1B, in some embodiments of the invention, the verification process 100 is carried out with the use of a verification device 180 with a verification database 182. In some embodiments of the invention, the verification device 180 can be a stand-alone device or in selective communication with the verification database 182. In some embodiments of the invention, the verification database 182 is located on the verification device 180. In some embodiments of the invention, the verification database 182 is not located on the verification device 180, and is capable of being remotely accessed. In some embodiments of the invention, the verification device 180 is in selective communication with a verification processor 184. In some embodiments of the invention, the verification processor 184 allows for the reception and transmittal of data and information from the consumer through the use of a network 186.

Referring back to FIG. 1A, in step 120, at least one advertisement 121 is presented to the consumer. In some embodiments of the invention, the at least one advertisement 121 is pre-determined. In some embodiments of the invention, the at least one advertisement 121 may be chosen based on a variety of factors including, but not limited to, the consumer's location, the consumer's demographic information, previously input consumer information, the service requested, and other similar factors.

In step 130, the consumer is presented with at least one verification question 131 to ensure their awareness of the advertisement. In some embodiments of the invention, the at least one verification question 131 depends on the type of service the consumer is requesting. For example, if the consumer requests to view a television show on Hulu.com, the at least one advertisement 121 presented might include a requirement that the consumer use a mouse device to click on an interactive link while the at least one advertisement 121 is playing to verify that the consumer understands the at least one advertisement 121. In some embodiments of the invention, the at least one advertisement 121 might instruct the consumer to enter at least one variable keystroke in the advertisement screen, or respond through the use of a keyboard, or choose a multiple choice selection from a drop-down menu screen. In some embodiments of the invention, the at least one advertisement 121 might instruct the consumer to engage a mouse device to select an object in the advertisement, e.g., a red car or purple hat. In some embodiments of the invention, the at least one advertisement 121 presented might instruct the consumer to enter at least one variable keystroke using a keypad or touch screen if the consumer requests a service over a smart phone or PDA. These examples for explanatory purposes only and are not designed or intended to limit the scope of the invention.

In accordance with some embodiments of the invention, the at least one verification question 131 is presented before the at least one advertisement 121 begins playing. In some embodiments of the invention, the at least one verification question 131 is presented during the at least one advertisement 121. In some embodiments of the invention, the at least one verification question 131 is presented after the at least one advertisement 121.

In accordance with some embodiments of the invention, the at least one verification question 131 may be presented at multiple times during the at least one advertisement 121, thus resulting in a more interactive experience that requires the consumer's awareness during at least a portion of the at least one advertisement 121. In some embodiments of the invention, the consumer is required to make multiple variable keystrokes during the presentation of the at least one advertisement 121 to ensure awareness of the at least one advertisement 121 and receive access to the requested service. In some embodiments of the invention, the at least one verification question 131 is a randomly generated number or numbers where the consumer is required to make multiple variable keystrokes that match the randomly generated numbers. In some embodiments of the invention, the at least one verification question 131 is a randomly generated question, e.g., what is the sum of 2 plus 2, where the consumer is required to correctly answer the randomly generated question using a keypad. In some embodiments of the invention, the consumer is required to engage a mouse device multiple times during the presentation of the at least one advertisement 121 to ensure awareness of the at least one advertisement 121 and receive access to the requested service. In some embodiments of the invention, the consumer is required to press a stylus or a finger to a PDA or smart phone screen multiple times during the presentation of the at least one advertisement 121 to ensure awareness of the at least one advertisement 121 and receive access to the requested service.

In step 140, at least one verification response 141 from the consumer is received and a determination is made whether the at least one verification response 141 matches at least one correct response 142. A determination is made whether the verification response 141 matches the at least one correct response 142 in step 150. If the at least one verification response 141 matches the at least one correct response 142, then the consumer is allowed access to the requested service in step 160. In some embodiments of the invention, the at least one verification response 141 is presented during the at least one advertisement 121, and if the at least one verification response 141 matches the at least one correct response 142, then the at least one advertisement 121 presentation continues and the consumer is allowed access to the requested service after the completion of the at least one advertisement 121 presentation in step 160. If the at least one verification response 141 does not match the at least one correct response 142, then the consumer is not allowed to access the requested service and the connection to the service is terminated in step 170. In some embodiments of the invention, if the at least one verification response 141 does not match the at least one correct response 142, steps 120-170 are repeated at least once to allow the consumer to attempt to verify their cognitive awareness of the advertisement. In some embodiments of the invention, the repeated steps 120-170 include presenting a new advertisement that is different from the originally presented advertisement. In some embodiments of the invention, the repeated steps 120-170 include presenting a new advertisement that is the same as the originally presented advertisement.

In some embodiments of the invention, at least one advertisement with a verification process 100 is presented to the consumer while a requested service is being performed instead of presenting the advertisement with verification process 100 before the service is performed. In some embodiments of the invention, at least one advertisement with a verification process 100 is presented to the consumer while a requested service is being performed in addition to presenting the advertisement with verification process 100 before the service is performed.

In some embodiments of the invention, the consumer receives at least one product for being cognitively aware of at least one advertisement 121. In some embodiments of the invention, the at least one product is a device that allows the consumer to access at least one service. In some embodiments of the invention, the at least one product is offered to the consumer at a reduced rate in exchange for the consumer being cognitively aware of at least one advertisement 121 presented with a verification process 100. In some embodiments of the invention, the at least one product is designed so that multiple advertisements are presented to the consumer during the operation of the at least one service. For example, the consumer might receive a free or reduced cost cell phone that is programmed to present at least one advertisement 121 with a verification process 100 during the course of the use of the cell phone. This example is for explanatory purposes only and is not designed or intended to limit the scope of the invention.

Embodiments of the verification process 100 may be implemented on various devices, including, but not limited to: radio, television, cellular phones, telephones, video games, smart phones, PDAs, electronic book readers, satellite television, internet websites, and internet applications.

Figure 2A:
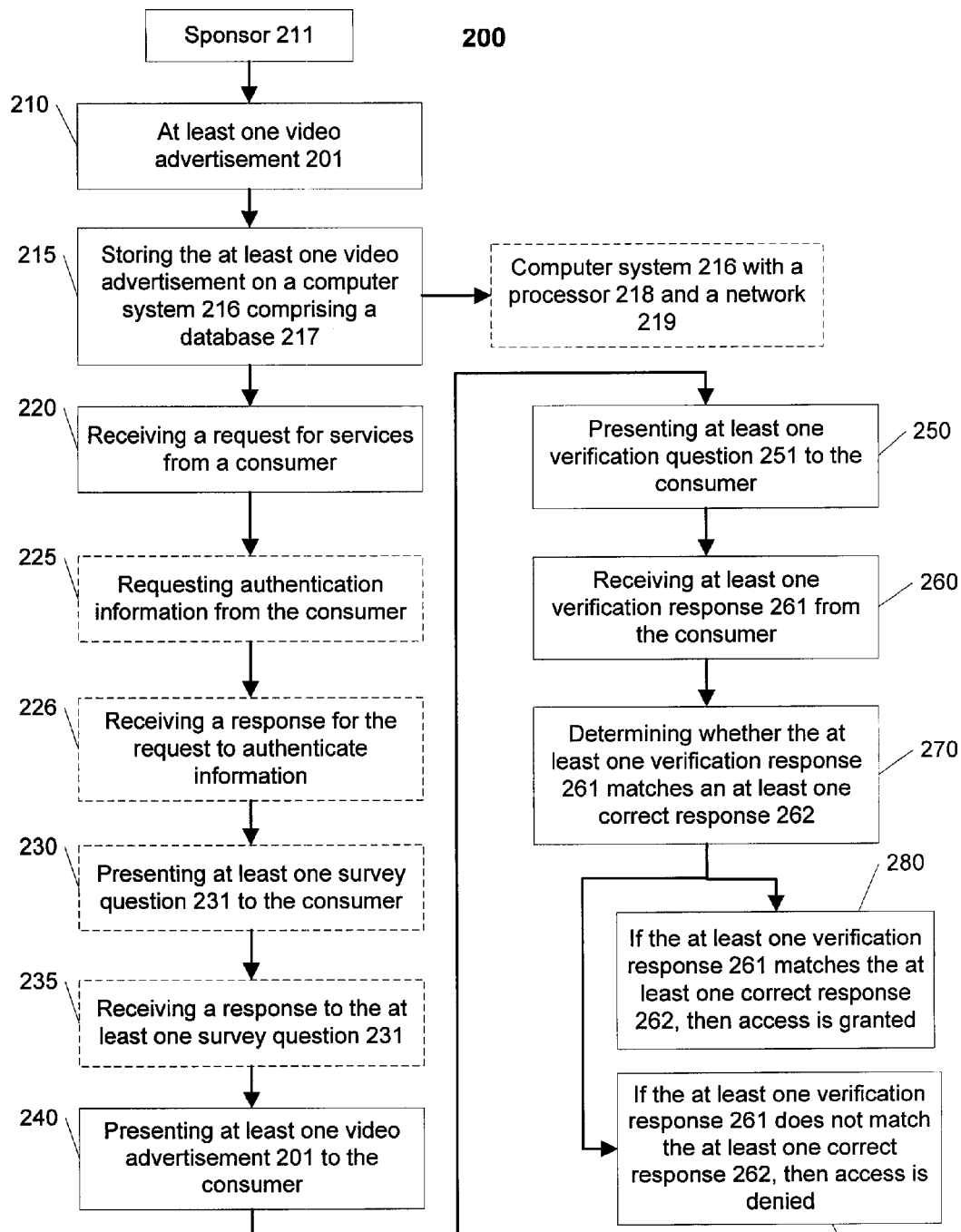
FIG. 2 is a schematic diagram depicting a verification process to ensure a consumer is cognitively conscious of a video advertisement according to an embodiment of the invention.

FIG. 2A is a schematic diagram depicting a verification process 200 to ensure a consumer is conscious of at least one video advertisement 201 according to one embodiment of the invention. In step 210, at least one sponsor 211 creates the at least one video advertisement 201, which includes video data. In some embodiments of the invention, the at least one video advertisement 201 includes audio data in addition to the video data. In some embodiments of the invention, the at least one video advertisement 201 does not have any audio data. In some embodiments of the invention, there are multiple sponsors with multiple advertisements. The at least one video advertisement 201 may include pictures or text, or a combination of pictures and text.

In step 215, the at least one video advertisement 201 is stored on a computer system 216 comprising a database 217.

In some embodiments of the invention, the computer system 216 also comprises a processor 218 that is in selective communication with a network 219.

Figure 2B:
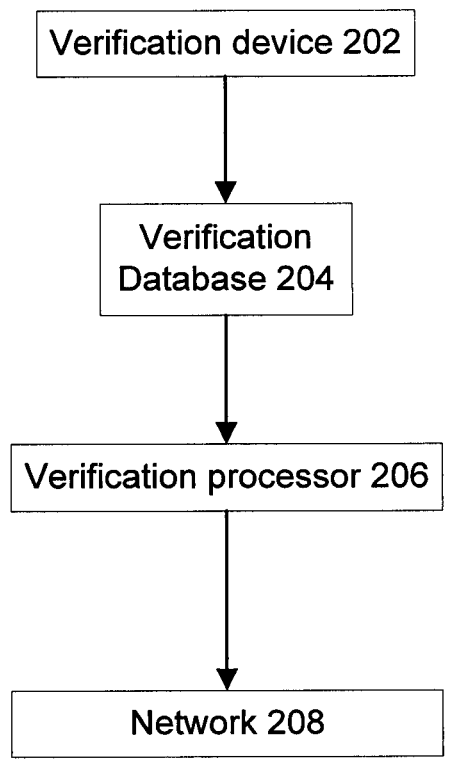

As shown in FIG. 2B, in some embodiments of the invention, the verification process 200 is carried out with the use of a verification device 202 with a verification database 204. In some embodiments of the invention, the verification device 316 can be a stand-alone device or in selective communication with the verification database 204. In some embodiments of the invention, the verification database 204 is located on the verification device 202. In some embodiments of the invention, the verification database 204 is not located on the verification device 202, and is capable of being remotely accessed. In some embodiments of the invention, the verification device 202 is in selective communication with a verification processor 206. In some embodiments of the invention, the verification processor 206 allows for the reception and transmittal of data and information from the consumer through the use of a network 208.

Referring back to FIG. 2A, in step 220, a consumer makes a request for a service. The service may be, but is not limited to, viewing a television show, viewing a document, viewing information on a social networking webpage, viewing a news article from an online newspaper or magazine, or any other viewable interactive media, broadcast media, or new media. The consumer could be one person or a plurality of people who are requesting the service.

In accordance with some embodiments of the invention, the consumer is asked to log-in or authenticate information when requesting a service as shown in step 225. The log-in or authentication information may be entered by the consumer using a keyboard, mouse, voice-recognition device, or another authentication device. In some embodiments of the invention, the consumer is required to log-in or authenticate themselves with their response in step 226. In some embodiments of the invention, the consumer is not required to log-in or authenticate themselves with their response in step 226.

The consumer is presented with at least one survey question 231 as shown in step 230. The at least one survey question 231 may be, but are not limited to, questions about personal information, e.g., do you own a house, or preferences, e.g., do you enjoy diet soda. In some embodiments of the invention, follow-up survey questions 232 to the at least one survey question 231 are asked based on a consumer's response 235 to the previous survey question 231. For example, if the at least one survey question 231 asked is: Do you own a house, and the consumer response 235 is no, then the follow-up survey question 232 might be: Do you own a car. If the consumer indicated in the follow-up survey question 232 that they do own a car, then the at least one video advertisement 201 might be for car insurance, or another car-related service.

In step 240, the at least one video advertisement 201 is presented to the consumer. In some embodiments of the invention, the at least one video advertisement 201 is predetermined. In some embodiments of the invention, the at least one video advertisement 201 may be chosen based on a variety of factors including, but not limited to, the consumer's location, the consumer's response 235 to at least one survey question 231 and any follow-up survey questions 232, the consumer's demographic information, prior consumer information, the service requested, or any other applicable factor.

In step 250, the consumer is presented with at least one verification question 251 to ensure their awareness of the at least one video advertisement 201. In some embodiments of the invention, the at least one verification question 251 depends on the type of service the consumer is requesting. For example, if the consumer requests to view a television show on Hulu.com, the at least one video advertisement 201 presented might include a requirement that the consumer use a mouse device to click on an interactive link while the at least one video advertisement 201 is being presented to verify that the consumer is watching the at least one video advertisement 201. In some embodiments of the invention, the at least one video advertisement 201 might instruct the consumer to enter at least one variable keystroke in the screen where the at least one video advertisement 201 is being presented, or respond through the use of a keyboard, or choose a multiple choice selection from a drop-down menu screen. In some embodiments of the invention, the at least one advertisement 241 presented before the service initiates might instruct the consumer to enter at least one variable keystroke using a keypad or touch screen using a smart phone or PDA. These examples are for explanatory purposes only and are not designed or intended to limit the scope of the invention.

In some embodiments of the invention, the at least one verification question 251 is presented before the at least one video advertisement 201 is presented. In some embodiments of the invention, the at least one verification question 251 is presented during the at least one video advertisement 201. In some embodiments of the invention, the at least one verification question 251 is presented after the at least one video advertisement 201.

In some embodiments of the invention, the at least one verification question 251 may be presented at multiple times during the at least one video advertisement 201, thus resulting in a more interactive experience and requiring the consumer's awareness during at least a portion of the at least one video advertisement 201. In some embodiments of the invention, the consumer is required to make multiple variable keystrokes during the presentation of the at least one video advertisement 201 to ensure awareness of the at least one video advertisement 201 and receive access to the requested service. In some embodiments of the invention, the consumer is required to engage a mouse device multiple times during the presentation of the at least one video advertisement 201 to ensure awareness of the at least one video advertisement 201 and receive access to the requested service. In some embodiments of the invention, the consumer is required to press a stylus or a finger to a PDA or smart phone screen multiple times during the presentation of the at least one video advertisement 201 to ensure awareness of the at least one video advertisement 201 and receive access to the requested service.

In step 260, at least one verification response 261 from the consumer is received by the computer system 216. A determination is made by the database 217 whether the at least one verification response 261 matches at least one correct response 262 in step 270. If the at least one verification response 261 matches the at least one correct response 262, then the consumer is allowed access to the requested service in step 280. If the at least one verification response 261 does not match the at least one correct response 262, then the consumer is not allowed to access the requested service and the connection to the service is terminated in step 290. In some embodiments of the invention, if the at least one verification response 261 does not match the at least one correct response 262, steps 220-290 are repeated at least once to allow the consumer to attempt to verify their awareness of the advertisement. In some embodiments of the invention, the repeated steps 220-290 include presenting a new advertisement that is different from the originally presented advertisement. In some embodiments of the invention, the repeated steps 220-290 include presenting a new advertisement that is the same as the originally presented advertisement.

In accordance with some embodiments of the invention, at least one advertisement with a verification process 200 is presented to the consumer while a requested service is being performed instead of presenting the at least one video advertisement 201 with verification process 200 before the service is performed. In some embodiments of the invention, at least one advertisement with a verification process 200 is presented to the consumer while a requested service is being performed in addition to presenting the at least one video advertisement 201 with verification process 200 before the service is performed.

In some embodiments of the invention, the consumer receives at least one product for being cognitively aware of at least one video advertisement 201. In some embodiments of the invention, the at least one product is a device that allows the consumer to access at least one service. In some embodiments of the invention, the at least one product is offered to the consumer at a reduced rate in exchange for the consumer being cognitively aware of at least one advertisement 201 presented with a verification process 200. In some embodiments of the invention, the at least one product is designed so that multiple advertisements are presented to the consumer during the operation of the at least one service. For example, the consumer might receive a free or reduced cost cell phone that is programmed to present at least one advertisement 201 with a verification process 200 during the course of the use of the cell phone. This example is for explanatory purposes only and is not designed or intended to limit the scope of the invention.

One embodiment of the verification process 200 includes having a consumer sign-up on a website to receive a service. After signing up for the service, the consumer requests to use a service, such as making a phone call using a web phone. A sponsor 211 has stored at least one video advertisement 201 in a database 217 in selective communication with a computer system 216. Authentication and/or survey questions may be presented to the consumer before the service begins. During the phone call, service is interrupted so that the consumer is presented with at least one video advertisement 201. The consumer is presented with at least one verification question 251, e.g., use a mouse device to select the red pony on the advertisement screen. If the consumer uses the mouse device and correctly selects the red pony, then the at least one video advertisement 201 continues and the consumer is eventually returned to his phone call. If the consumer does not correctly select the red pony, then the at least one verification question 251 may be repeated once or multiple times until the consumer correctly responds to the at least one verification question 251.

Embodiments of the verification process 200 may be implemented on various devices, including, but not limited to, video games, smart phones, PDAs, electronic book readers, satellite television, internet websites, and internet applications.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A method for verifying a consumer's cognitive awareness of an advertisement, comprising:
  receiving, by a computer system comprising a database, a request for a service from a consumer wherein the service comprises providing a radio program, a podcast, a television show, phone service, a news article, an interactive media service, a broadcast media service, or a news media service;
  presenting, by the computer system, at least one advertisement to the consumer, following the request for the service, wherein the at least one advertisement preempts the service;
  presenting, by the computer system, at least one verification question to the consumer during the advertisement;
  receiving, by the computer system, at least one verification response from the consumer;
  determining, by the computer system, whether the at least one verification response matches at least one correct response; and
  granting access to the service upon the at least one verification response matching the correct response following completion of the advertisement.

2. The method of claim 1, wherein the advertisement comprises a video, and the verification response from the consumer comprises an interaction with the video.

3. The method of claim 1, further comprising:
  selecting, by the computer system, the at least one advertisement based upon one of more of the following factors: a location of the consumer, demographic information relating to the consumer, previously received information pertaining to the consumer, and the service request.

4. The method of claim 1, further comprising:
  selecting, by the computer system, the at least one verification question based upon the service request.

5. The method of claim 1, further comprising:
  requesting that the consumer interact with the computer system as the at least one verification response, wherein the interaction comprises one or more the following: entering a variable keystroke on an input keyboard, keypad, or touch screen, and engaging an input device to select a visible object in the at least one advertisement.

6. The method of claim 1, wherein the consumer is requested to interact multiple times with the computer system.

7. The method of claim 1, wherein the at least one verification question is presented more than once during the at least one advertisement.

8. The method of claim 1, further comprising:
  allowing the consumer to repeat the verification process upon the verification response not matching the correct response.

9. A system for verifying a consumer's cognitive awareness of a video advertisement, comprising:
  a computer processor connected to a network; and
  a database in communication with the computer processor;
  wherein the computer processor is programmed to:
    receive at least one video advertisement from an advertiser via the network;
    store the at least one video advertisement in the database;
    receive a request for a service from a user wherein the service comprises providing a radio program, a podcast, a television show, phone service, a news article, an interactive media service, a broadcast media service, or a news media service;
    present at least one advertisement to the user via the network following the request for the service, wherein the at least one advertisement preempts the service;
    present at least one verification question to the user during the advertisement;
    receive at least one verification response from the user, wherein the at least one verification response comprises the user interacting with the video advertisement;
    determine whether the at least one verification response matches at least one correct response; and
    grant access to the service upon the at least one verification response matching the correct response following completion of the video advertisement.

10. A computer-implemented method comprising:
  requesting, electronically, a free service from a server, comprising a computer processor, using a user communication device wherein the free service comprises providing a radio program, a podcast, a television show, phone service, a news article, an interactive media service, a broadcast media service, or a news media service;
  receiving, electronically, the free service from the server using the user communication device;
  receiving, electronically, an advertisement from the server before or during the free service, wherein the advertisement preempts the free service;
  during the advertisement, receiving, electronically, at least one verification question from the server;
  sending, electronically, at least one verification response to the at least one verification question; receiving access to the free service following completion of the advertisement if the at least one verification response matches the correct response.

11. The method of claim 10, wherein the advertisement comprises a video, and the at least one verification response comprises the user interacting with the video.

* * * * *